(12) United States Patent
Roberts

(10) Patent No.: US 6,282,007 B1
(45) Date of Patent: Aug. 28, 2001

(54) OPTICAL TIMING DETECTION

(75) Inventor: Kim Byron Roberts, Welwyn Garden City (GB)

(73) Assignee: Nortel Networks Limited, Montreal (CA)

(*) Notice: Subject to any disclaimer, the term of this patent is extended or adjusted under 35 U.S.C. 154(b) by 0 days.

(21) Appl. No.: 08/886,994

(22) Filed: Jul. 2, 1997

(30) Foreign Application Priority Data

Dec. 19, 1996 (GB) .................................................. 9626402

(51) Int. Cl.[7] .......................... H04B 10/04; H04B 10/00; H04J 14/08

(52) U.S. Cl. .......................... 359/181; 359/158; 359/188; 359/138

(58) Field of Search .................................. 359/176, 174, 359/181, 184, 158, 138, 139, 128

(56) References Cited

U.S. PATENT DOCUMENTS

| | | | |
|---|---|---|---|
| 5,369,520 | * 11/1994 | Avramopoulos et al. | 359/176 |
| 5,379,143 | 1/1995 | Takano | 359/177 |
| 5,434,692 | * 7/1995 | Auffret et al. | 359/158 |
| 5,444,560 | 8/1995 | Barnsley | 359/138 |
| 5,446,573 | 8/1995 | Lomashevitch et al. | 359/158 |
| 5,457,559 | * 10/1995 | Saito et al. | 359/135 |
| 5,485,274 | 1/1996 | Kemmler | 356/350 |
| 5,504,610 | 4/1996 | Bulow | 359/173 |
| 5,508,845 | * 4/1996 | Frisken | 359/161 |
| 5,546,190 | 8/1996 | Hill et al. | 359/158 |
| 5,548,433 | 8/1996 | Smith | 359/158 |
| 5,574,588 | 11/1996 | Kawanishi et al. | 359/158 |
| 5,594,583 | * 1/1997 | Devaux et al. | 359/184 |
| 5,625,722 | * 4/1997 | Froberg et al. | 385/1 |
| 5,675,428 | * 10/1997 | Henmi | 359/161 |
| 5,745,613 | * 4/1998 | Fukuchi et al. | 385/24 |
| 5,757,529 | * 5/1998 | Desurvire et al. | 359/179 |
| 5,798,852 | * 8/1998 | Billes et al. | 359/158 |
| 5,953,138 | * 9/1999 | Ellis | 359/123 |
| 5,999,293 | * 12/1999 | Manning | 359/139 |

FOREIGN PATENT DOCUMENTS

| | | |
|---|---|---|
| 2063016 | 9/1992 | (CA) . |
| 0 595 206 | 5/1994 | (DE) . |
| 2 254 746 A | 10/1992 | (GB) . |
| 2 256 761 A | 12/1992 | (GB) . |
| 2 257 319 A | 1/1993 | (GB) . |
| 2 259 419 A | 3/1993 | (GB) . |
| WO 93/15566 A1 | 8/1993 | (WO) . |
| WO 94/23507 A1 | 10/1994 | (WO) . |
| WO 95/10795 | 4/1995 | (WO) . |
| WO 97/34193 | 9/1997 | (WO) . |

OTHER PUBLICATIONS

Chbat, "Optical Clock Recovery Demonstration Using Periodic Oscillations . . . ", IEEE Photonics Technology Letters, vol. 3, No. 1, Jan. 1, 1991, pp 65–67.

Mikkelsen, "Polarisation insensitive wavelength conversion of 10 Gbit/s . . . ", Electronics Letters, vol. 30, No. 3, Feb. 3, 1994, pp 260–261.

Joergensen, "Wavelength Conversation by Optimized Monolithic Integrated March–Zehmder Interferometer", IEEE Photonics Technology Letters, vol. 8, No. 4, 4/96, pp 521–523.

(List continued on next page.)

*Primary Examiner*—Leslie Pascal
*Assistant Examiner*—M. R. Sedighian
(74) *Attorney, Agent, or Firm*—Lee, Mann, Smith, McWilliams, Sweeney & Ohlson

(57) ABSTRACT

Optical timing detection, for phase comparison of optical signals, or clock recovery is achieved by arranging an interferometer to be responsible to data transitions. A pulse train is fed into both arms of the interferometer. An optical amplifier (20) enables the interference condition to be changed when the data is fed into one arm. The output changed if the data transitions lose synchronization with the pulse train.

15 Claims, 19 Drawing Sheets

OTHER PUBLICATIONS

Jinno, "All Optical Signal Regularizing/Regeneration Using a Nonlinear...", Journal of Lightwave Technology, vol. 12, No. 9, 9/94, pp 1648–1659.

IEEE Photonics Technology, vol. 8, Sep. 96 "10 Gbs Wavelength Conversion with Integrated Multiquantum–Well–Based Three–Port Mach–Zehnder Interferometer" Idler et al.

Photonics Technology Letters, vol. 2, No. 6, Jun. 1990, p404–406 "Optimization of Strongly Guiding Semiconductor Rib Waveguide Y–Junctions" Claude Rolland, D M Adams, David Yevick and Bjorn Hermansson.

Photonics Technology Letters, vol. 8, No. 8, Aug. 1996, p1018–1020 "Phase–Engineered III–V MQW Mach–Zehnder Modulators" June Yu, Claude Rolland, David Yevick, Azmina Somani, Scott Bradshaw.

Electronics Letters, Jan. 7, 1993, vol. 29, No. 1 "Decision Gate for All–Optical Data Retiming Using a Semiconductor Laser Amplifier in a Loop Mirror Configuration" M Eiselt, W Pieper and H G Weber.

Electronics Letters, Jul. 2, 1992, vol. 28, No. 14 "All–Optical Regenerator Based on Nonlinear Fibre Sagnac Interferometer" M. Jinno and M Abe.

Proc ECOC ovol. 2, Sep. 25–29, 1994, Florence "Injection Locked Laser as Wavlength Converter and Optical Regenerator up to 10 Gbit/s" K Weich, J Horer, E Patzak, D J As, R Eggermann, M Mohrle.

Topical Meeting on "Opt. Amps and their Applications", Jul. 11–13, 1996, Monterey "Optical Signal Processing using Monolithically Integrated Semiconductor Laser Amplifier Structures" N Agrawal, E Jahn, W Pieper, H –J Ehrke.

Electronics Letters, Jul. 7, 1988, vol. 24, No. 14 "All–Optical Regenerator" C R Giles, T Li, T H Wood, C A Burrus.

* cited by examiner

INTERFEROMETER ARRANGEMENT

INTERFEROMETER OPERATING AS SAMPLER

INTERFEROMETER OPERATIVE AS PHASE COMPARATOR

Fig 10 Phase Comparator with Common Mode Cancellation

OPTICAL REGENERATOR

MULTIPLEXER

MULTIPLEXER

DEMULTIPLEXER

DEMULTIPLEXER

Interferometer Arrangement

Fig 18 Interferometer Arrangement
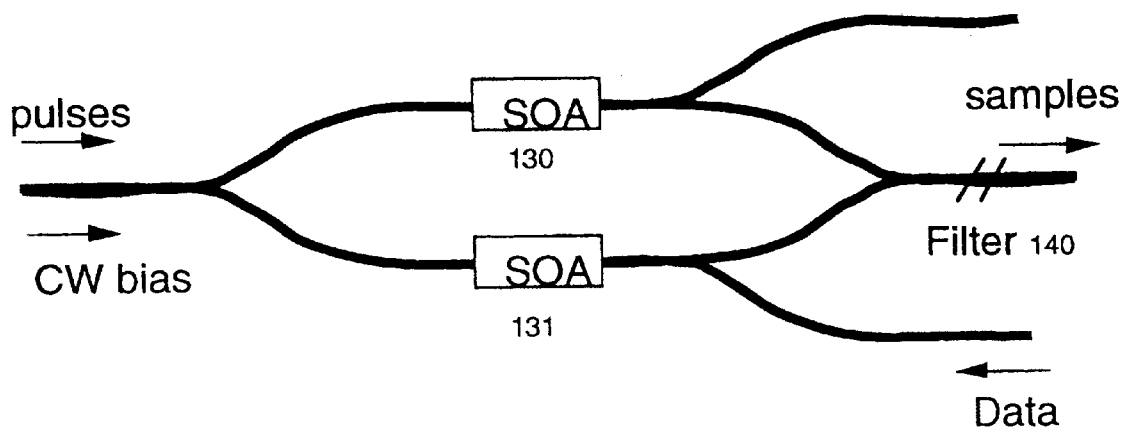
Fig 19 Interferometer Arrangement
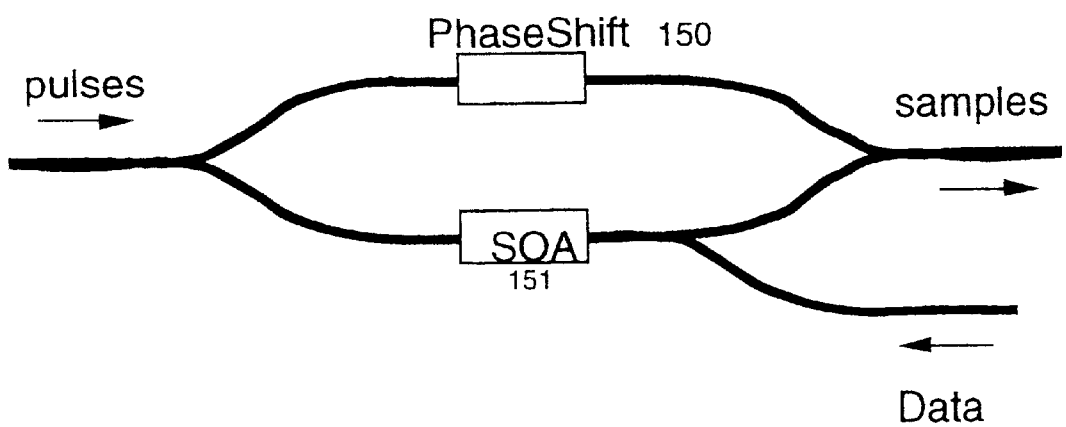

Fig 20 Interferometer Arrangement
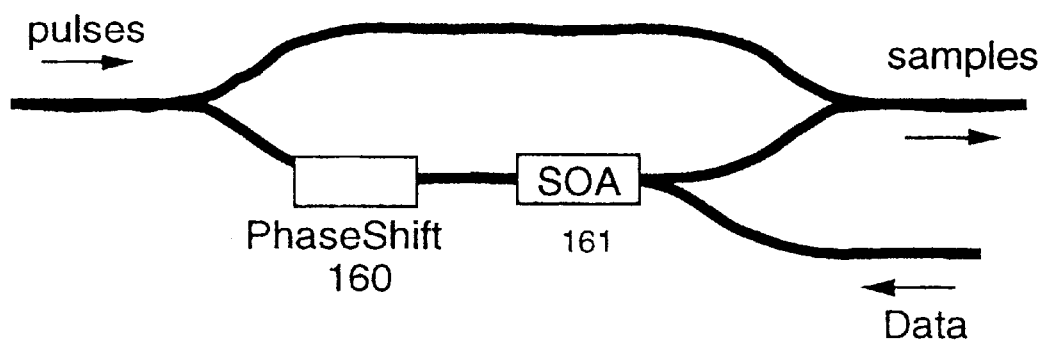

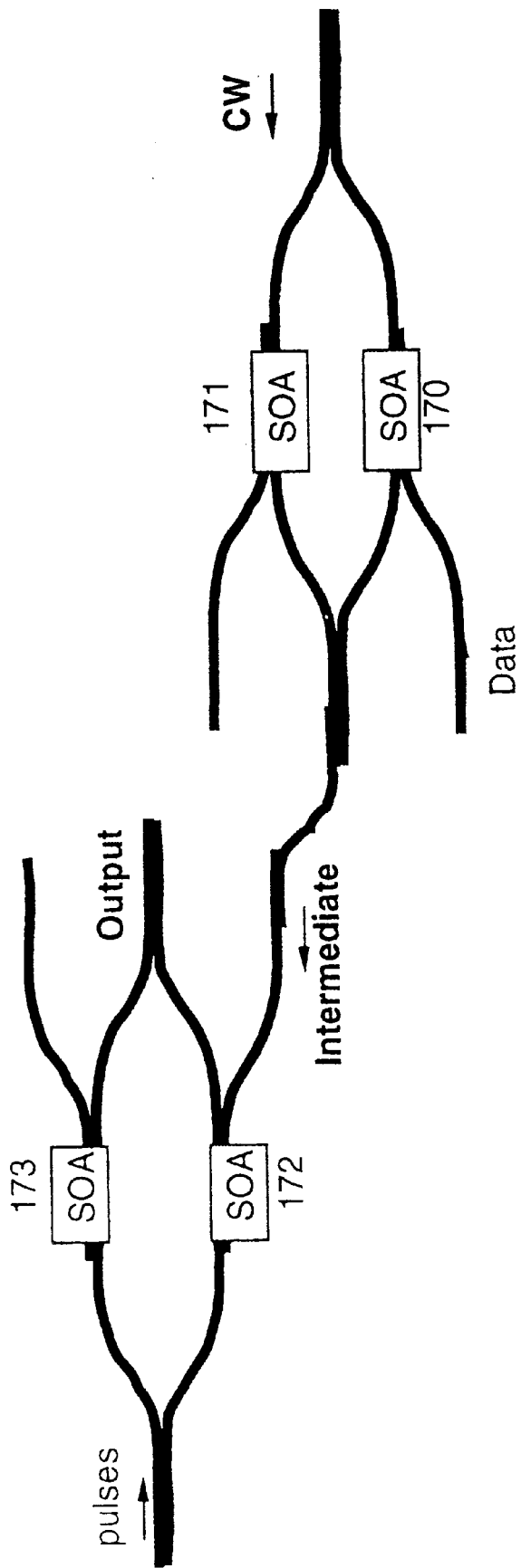
Fig 21 Two stage interferometer arrangement

Single stage non-linear
inverting response compared
to 1/x response

Fig 23 overall response

OPERATION OF TWO STAGE INTERFOMETER ARRANGEMENT

OPTICAL TIMING DETECTION

FIELD OF THE INVENTION

The invention relates to interferometer arrangements, clock recovery devices, phase detectors, methods of detecting data transitions, methods of recovering clocks, and methods of comparing phases.

BACKGROUND TO THE INVENTION

In any digital transmission system, it is necessary to recover the timing of the information being sent. Often it is considered inefficient to sent a separate clock signal, and so it is necessary to recover the timing from the data signal itself. In optical transmission systems this is usually done after conversion into electrical form, using one of two methods.

Firstly, a phase locked loop can be used to lock a separately generated clock to transitions in the data signal. Short periods where there are no transitions in the incoming data signal are bridged by the clock generator, which needs to be sufficiently stable.

Secondly, the incoming data can be filtered to extract a clock signal. In this case a resonant filter will be necessary, to fill in periods where there are no transitions. Furthermore, if the data is coded in non return to zero (NRZ) code for example, there may be substantially zero energy at the clock frequency. In these cases, a non-linear operation such as a squaring function is necessary to create a response, preferably a peak, at the clock frequency. A narrow band resonant filter can then be used to extract the clock frequency.

In optical transmission systems, such clock recovery arrangements have been used in regenerators and in receivers. However, electronic devices become expensive at high data rates, particularly when there is no other requirement for optical to electrical conversion.

There have been many attempts to implement more and more regenerator or receiver circuitry in optical form for improved performance or reduced cost. It is known to achieve a non linear function using an optical to electrical conversion device, then extract the clock frequency with a filter.

An early all optical regenerator is known from U.S. Pat. No. 5,446,573 using a non linear ring resonator comprising a semi conductor laser and phase modulators. However, it is difficult to make a practical device or integrate the arrangement.

Partly optical regenerators are known, where latching of the optical data input is carried out optically, following conventional electrical clock recovery. Optical clock recovery circuits were restricted to the use of mode-locked laser arrangements, eg as shown in U.S. Pat. No. 5,548,433. As shown in FIG. 1, a coupler 1 is used to couple an input optical data signal to a laser 2. The phase and frequency of an output pulse stream is locked to the input, since the laser acts as a resonant narrow band filter. However, such methods are limited to use with optical data signals such as return to zero (RZ) coded signals which have sufficient energy at the clock frequency, unlike NRZ coded signals. Most high capacity optical transmission systems use NRZ coding.

Another arrangement which is limited to use with RZ coded signals is known from U.S. Pat. No. 5,574,588. An optical phase locked loop is created by detecting correlation between the input signal and a new clock signal by combining them and passing them through an optical amplifier. U.S. Pat. No. 5,504,610 shows achieving such an optical locked loop using an optical mixer to multiply two inputs. This correlation process requires that substantial energy be present in the data at the clock frequency.

One document which tries to address the limitation to RZ coded signals is U.S. Pat. No. 5,434,692, which discloses a device for use with NRZ, CMI (Code, Mark Inversion) and biphase coded data. First, a passive filter delay interferometer is used to linearly add the input data to itself. The fibre 10 needs to be lengthy in high bit rate systems, probably many kilometers, to avoid beat noise. A three level signal is produced, which drives an optical amplifier 11 for am to pm conversion.

This, together with a narrow band filter 12, give a non linear function which produces a response at the clock frequency. A resonant filter 13 can then extract the clock.

Such a device is not practicable for commercial data transmission systems because it is bit rate specific, impossible to integrate, and difficult to tune. The narrow band filtering element in particular would require piezo electric devices for tuning, which are insufficiently reliable for field use. Furthermore, for each different type of coding, the XOR logical operation would need to be changed.

SUMMARY OF THE INVENTION

It is an object of the invention to provide improved devices and methods.

According to a first aspect of the invention, there is provided an interferometer arrangement comprising an interferometer for receiving an optical signal modulated with data to vary an interference condition of the interferometer according to the data such that an output of the interferometer based on the interference condition is responsive to transitions in the data. By using an interferometer in this way, the timing of the transitions can be determined optically, without conversion to electrical form, independently of the type of coding used for the data. Furthermore, the arrangement can be produced in integrated form.

Advantageously, the interferometer is a two arm type. This type is easier to integrate, easier to control, and can handle a range of bit rates.

Advantageously, the arrangement comprises means for biasing the interferometer to give a peak output when the data is at an intermediate state between low and high states. This enables the response to the interferometer to be adjusted as desired.

Advantageously the interferometer arrangement is used in a clock recovery arrangement. This enables clock recovery independent of data coding without conversion of the data into electrical form.

Advantageously, the interferometer is arranged to receive the generated optical clock, and the interferometer output is dependent on the relative phases of the generated optical clock and the transitions in the optical data signal. This enables a phase lock loop to be constructed, in which the high bandwidth parts at least are implemented in optical form.

Advantageously, the clock recovery arrangement is used with an optical sampler to retime an optical signal. This enables a practical all optical regenerator to be created capable of handling different types of data coding. Optical retiming may also be useful at a transmitter end or receiver end of the optical path.

According to another aspect of the invention there is provided a clock recovery device for recovering a clock from an optical data signal, the device comprising:

a phase locked loop; wherein the loop comprises an interferometer arrangement; and the device is arranged to recover the clock optically from the optical data signal.

An interferometer based phase locked loop enables clock recovery to be achieved optically, and for a variety of data coding types.

Advantageously, the interferometer arrangement is responsive to the transactions in the data.

According to another aspect of the invention there is provided a phase detector for comparing the phase of modulation of two input signals comprising:

an optical comparator for receiving the two input signals in optical form, performing a non-linear operation on the signals, and outputting a signal dependent on the relative phase of the modulations of the two input signals.

Advantageously the phase detector comprises means for distinguishing a difference frequency of the comparator output, from other beat products of the modulations. The difference frequency contains the useful information on the two input signals.

Advantageously the distinguishing means comprises a low pass filter. This can be implemented relatively easily.

According to another aspect of the invention there is provided a clock recovery device comprising an optical pre-processing stage for processing an optical data signal; and a resonant stage for outputting a clock in response to an output of the pre-processing stage; wherein the two stages are integrated together.

To recover a clock from a range of optical data signals, a resonant stage require some sort of pre-processing. The provision of an optical pre-processing stage which can be integrated with a resonant stage enables a practical optical clock recovery device to be achieved.

According to another aspect of the invention there is provided a method of detecting data transitions in an optical data signal using an interferometer arrangement comprising the steps of:

inputting the optical data signal to the interferometer arrangement to vary an interference condition of the arrangement; and biasing the arrangement to output a signal responsive to the transitions in the data.

According to another aspect of the invention there is provided a method of recovering a clock from an optical signal modulated by coded data by performing a non-linear optical operation on the data so as to enable the clock to be recovered independently of the type of coding used for the data. Performing a non-linear optical operation on the data, such as those described above, enables clock recovery to be achieved without conversion to electrical form, and thus the hardware requirements can be simplified.

According to another aspect of the invention there is provided a method of recovering a clock from a modulated optical signal comprising the steps of:

using an interferometer to perform a non-linear operation on the modulation of the optical signal, and filtering the output of the operation to recover the clock.

Using an interferometer to perform a non-linear operation enables a variety of data coding formats to be handled and enables integration, to reduce costs.

According to another aspect of the invention there is provided a method of recovering a clock from an optical data signal, comprising the steps of:

inputting the optical data signal to an interferometer comprising an optically active element; and deriving a clock synchronised to the data signal.

Advantageously the interferometer comprises a two arm interferometer.

According to another aspect of the invention there is provided a method of comparing the phases of modulations of two input signals comprising the steps of:

inputting the signals in optical form to an optical comparator;

performing a non-linear operation on the signals; and outputting a signal dependent on the relative phase of the modulations.

Preferred features discussed above may be combined as appropriate, as would be apparent to a person skilled in the art. They may be combined with any aspect of the invention as appropriate.

BRIEF DESCRIPTION OF THE DRAWINGS

For a better understanding of the invention and how the same may be carried into effect, it will now be described by way of example with reference to the drawings, in which:

FIGS. 17 to 20 show alternative interferometer arrangements for use in sampling or clock recovery;

FIG. 21 shows a two stage interferometer arrangement;

DETAILED DESCRIPTION

Figure 1:
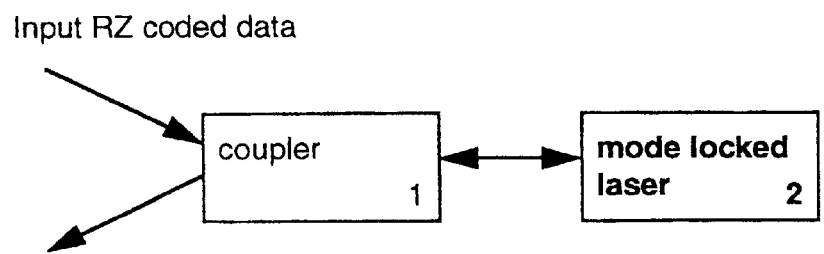
FIG. 1 and FIG. 2 show prior art arrangements.
Figure 2:
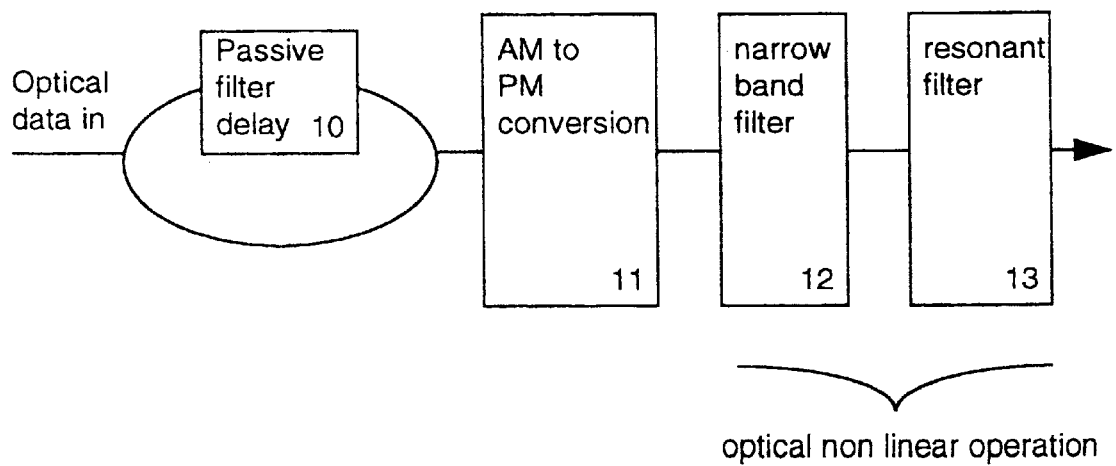
Figure 3:
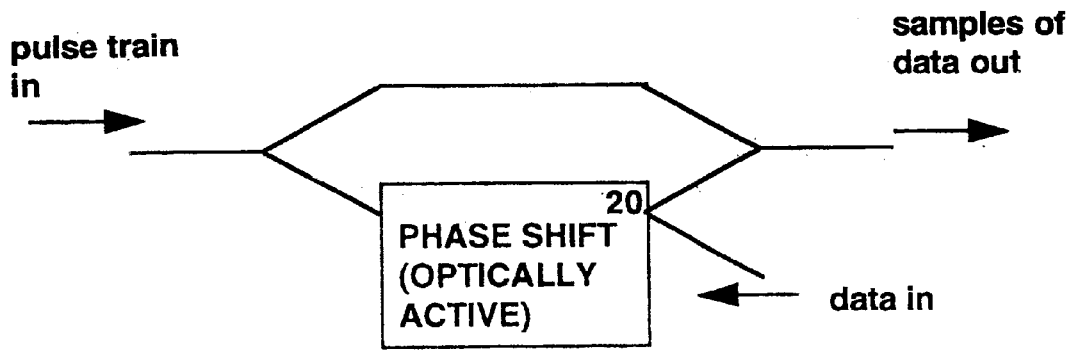
FIG. 3 shows an interferometer arrangement according to an embodiment of the invention.

With reference to FIG. 3, which shows features of the invention, an interferometer arrangement is shown including a phase shift means 20. An optical pulse train is input at one side of the interferometer. Optical data is input at either side of the interferometer, but to only one arm of the interferometer, so as to alter the condition of interference of the interferometer. Thus the output of the interferometer, constituted by a combination of the optical signals in each arm, will depend on whether the optical signals from the two arms combine with constructive interference or destructive interference. The phase shift means 20 can be arranged so that there is constructive interference when the data is high. Alternatively, the arrangement can be made in inverting form, so that there is constructive interference when the data is low. Alternatively, the peak output, where there is constructive interference can be arranged to coincide with the data beam at some point in-between high and low levels.

Figure 4:
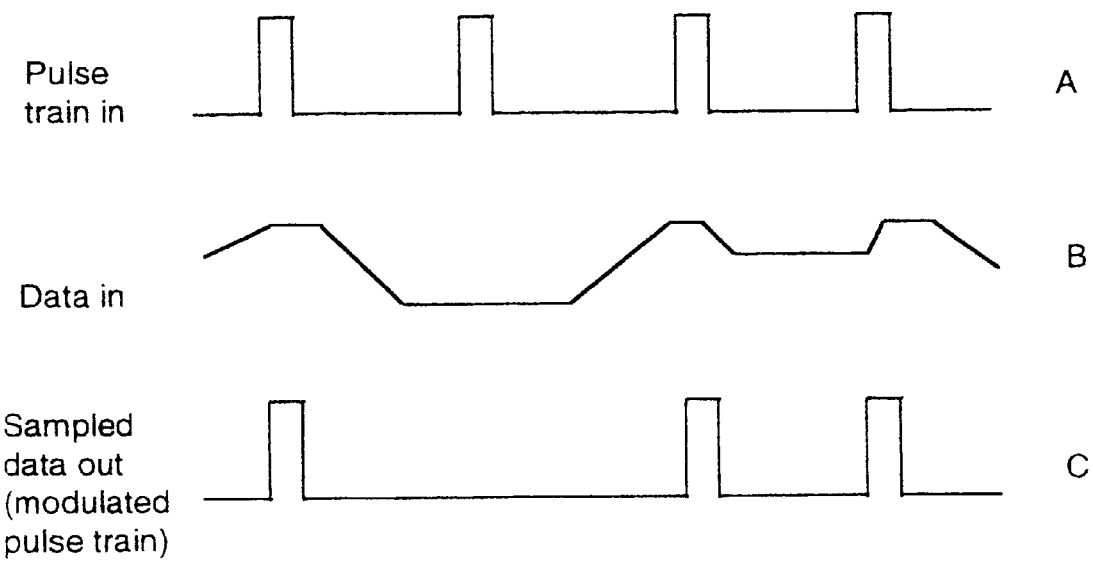
FIG. 4 shows waveforms for the interferometer of FIG. 3 operating as a sampler.

FIG. 4 shows input and output waveforms for the interferometer of FIG. 3 operating as a sampler. In this case, a pulse train A is input to both arms of the interferometer. Data in optical form is input to one of the arms. The phase shift means 20, typically implemented using a semiconductor optical amplifier, causes a phase shift in one arm, which results in the output waveform C of FIG. 4. For high levels of the data input signal, the pulse train is output in a similar form to the pulse train input, owing to constructive interference. Where the data level is low, owing to destructive interference, there is little or no output. Accordingly, effectively the output can be seen as the pulse train input modulated by the data, or it can be seen as samples of the data, sampled by the input pulses.

In principle, various types of non-loop interferometer could be used. The Mach-Zehnder type may be easiest to integrate and give best results in terms of stability and ease of tuning. In principle, a Michelson type interferometer could also be used.

FIG. 3 shows the data being fed in the interferometer in the opposite direction to the pulse train. This means the arrangement is simpler because the data does not need to be filtered out of the output. In principle the data could be fed into the interferometer in the same direction as the pulse train, in which case filtering would be needed to remove the data signal from the output.

Three types of applications will be described for the arrangement illustrated in FIGS. 3 and 4. The first and second relate to optical clock recovery. The third type relates to sampling a signal to regenerate it optically without conversion to electrical form.

Clock Recovery Applications

Figure 5:
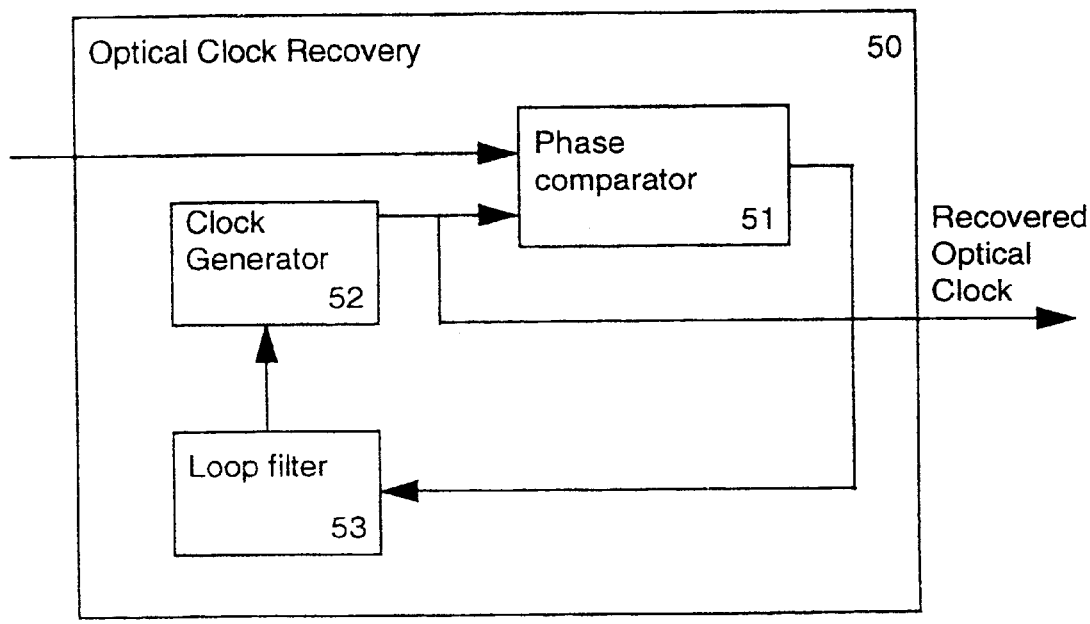
FIG. 5 shows an optical clock recovery arrangement for use in synchronising the sampler of FIGS. 3 and 4.

FIG. 5 shows an optical clock recovery arrangement 50 including a phase comparator 51, a clock generator 52, and a phase loop filter 53. Conventionally, such an arrangement has been produced for electrical signals, but it has been possible to achieve an optical phase comparator only suitable for operation with optical signals on which the data is coded in RZ form.

In the clock recovery arrangement of FIG. 5, the phase comparator receives the optical data input signal and an optical clock generated by the generator 52. Owing to the inbuilt stability of such generators, the loop filter 53 can operate effectively with a bandwidth much lower than that of the optical data signal. Accordingly, it is feasible and less expensive to implement the clock phase control and the clock generator in electrical form, and convert the electrical clock to optical form before input to the phase comparator.

Figure 6:
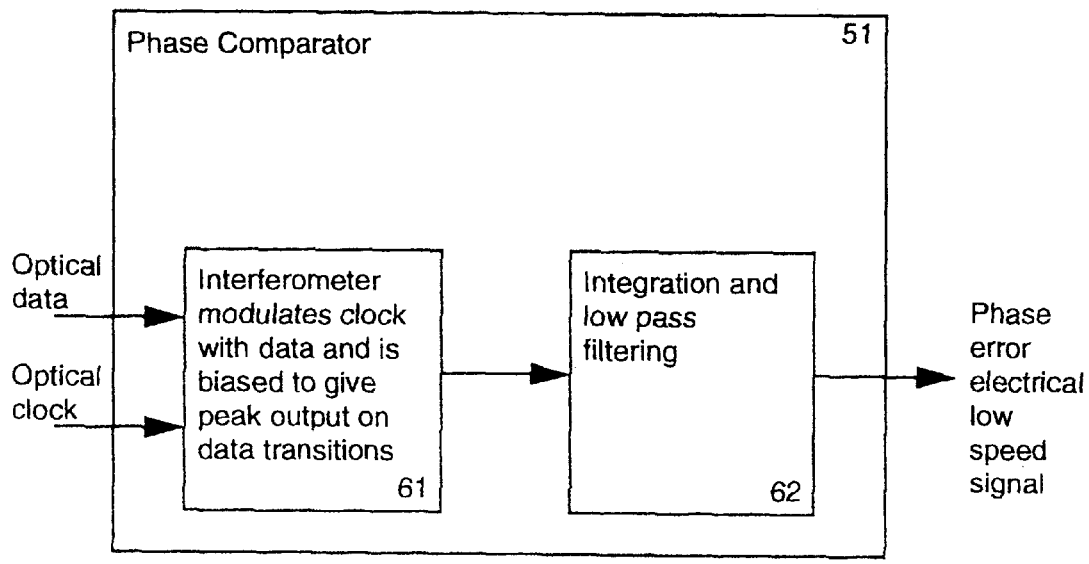
FIG. 6 shows in schematic form a phase comparator for use in the clock recovery arrangement of FIG. 5.

The optical phase comparator 51 is shown in schematic form in FIG. 6. An interferometer 61 is provided for modulating the clock with the optical data. The interferometer is biased to give a peak output when the data is somewhere between high and low states, and a reduced output at the high and low states. This enables the interferometer to be responsive, to data transitions, and thus determine timing of pulses optically. The interferometer may be arranged as shown in FIG. 3.

Figure 7A:
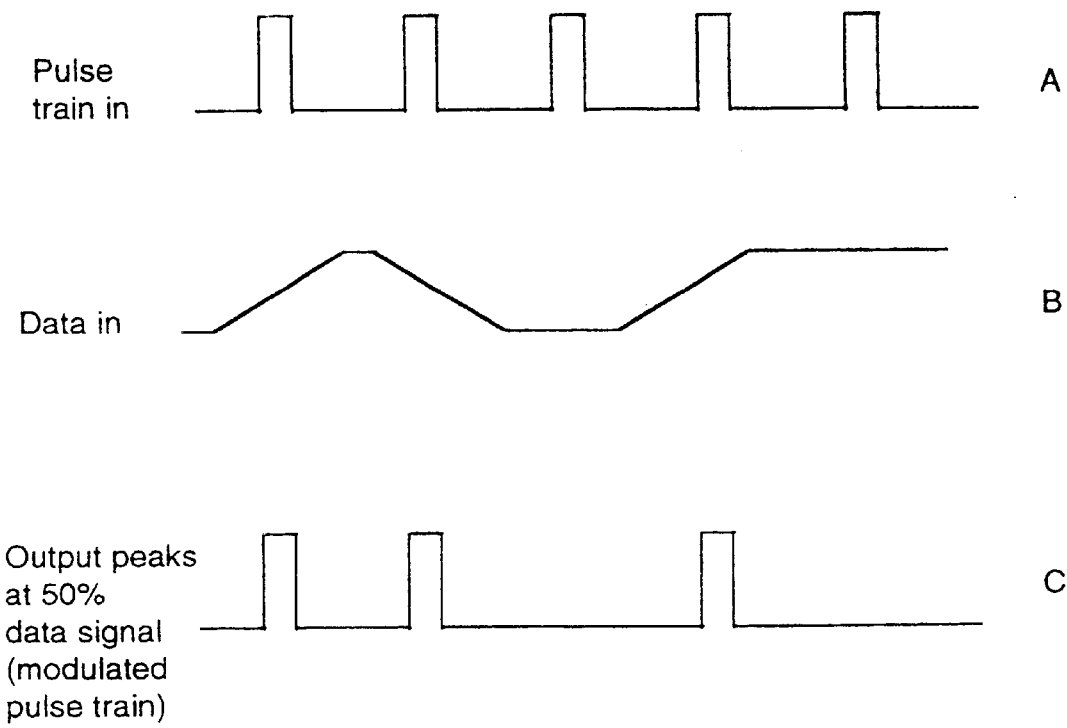
FIG. 7A shows waveforms for the interferometer of FIG. 3 when operating as part of the phase comparator of FIG. 6.

FIG. 7A shows the typical waveforms when the interferometer is used as a phase comparator, arranged to give peak output when the data is halfway between high and low states. As a result, if the phase of the clock drifts so as to take the clock pulses out of synchronisation with the data, the output peaks shown in waveform C of FIG. 7A would become changed in amplitude. Referring back to FIG. 6, the output pulse train would be passed through integration and low pass filtering functions 62. These would enable the phase comparator output to be independent of data patterns since there will be an averaging effect.

In practice this can be implemented by a PIN diode which would output a low speed electrical signal, typically with a bandwidth of up to hundreds of KiloHertz or a few MegaHertz, which can be fed back as shown in FIG. 5 to the loop filter 53, which is an analog low pass filter. The output of the filter is connected to the frequency control of the oscillator. Thus a change in the amplitude of the pulses from the interferometer could be detected as a change in the level of the integrated filtered output of the PIN diode, which could cause the frequency of the oscillator to adjust to compensate. Such phase locked loop methods are well known and will not be described here in more detail.

The output of the low frequency optical to electrical converter is the convolution of the power in these pulses with its impulse response. For conceptual simplicity, this can be thought of as approximately the integral of the power in the pulses over a response time of many thousands of pulses. Thus data with uneven amounts of ones and zeroes can be handled, provided fluctuations in the proportions of ones and zeroes don't have appreciable components at frequencies below the threshold of the converter.

The pulses output by the interferometer will be the strongest when the clock input pulses coincide with the data being at the 50% cross-over point, and will fall off with the cosine function as the data approaches a 1 or 0 symbol.

Figure 7B:
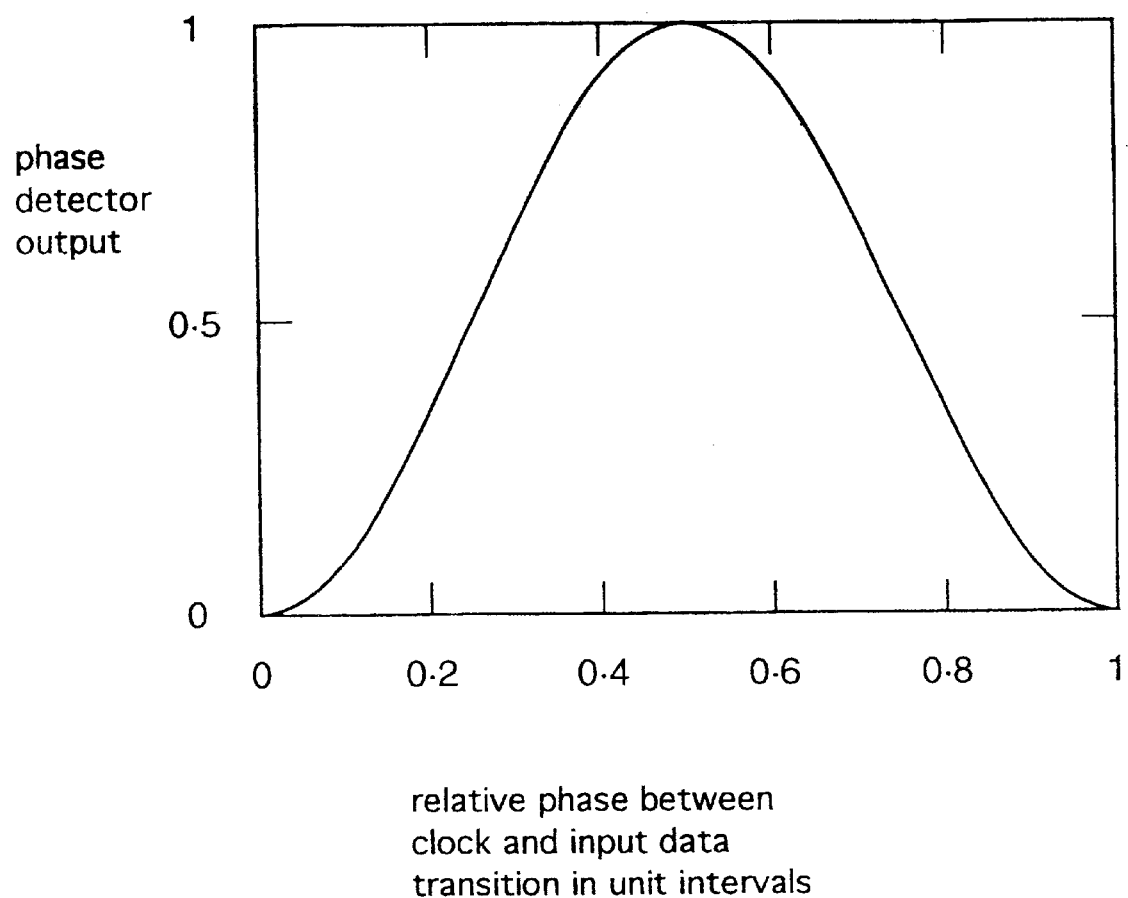
FIG. 7B shows the response of the phase comparator.

In practice the input data will not have a square waveform but may approach a raised cosine shape. In such a case the overall response of the phase detector after integration by a low pass filter is shown in FIG. 7B.

The phase locked loop is advantageously locked to the 0.5 level of the phase detector output, and optical delay used to obtain the desired clock to data phase. Locking to the 0.5 level of the detector output gives the maximum control range (between 0 and 0.5 unit intervals of relative phase), and uses the steepest slope on the response curve, for strong feedback of phase error.

The clock pulses are preferably generated at the full bit-rate, though sub-harmonics could be used.

Careful design and adjustment of the interferometer will enable maximum output, inverting or otherwise, when the data signal is in transition between logical states. In principle such transition could be between multilevel logic states. For two level logic the interferometer should give maximum output when the data signal has a power amplitude of 50% of the eye. To achieve this, the relative phase shift between the arms and the amount of phase shift which occurs in response to the optical data input, can be adjusted. In practice, amplitude saturation effects may also need to be considered. The optical power in the data input may cause the gain of the optical shift means to be altered or reduced. This also affects the condition of interference, and will need to be accounted for when designing the interferometer. An ideal response, ignoring gain effects, and for a narrow clock pulse, much narrower than the bit period, is proportional to the following equation:

$$\frac{\cos(\pi signal(nT + \phi)) + 1}{2}$$

where
  φ is the phase of the clock pulse,
  T is the bit period,
  n is an integer,
  and signal is the average power of the data, weighed over a clock pulse,
  centred at that time.

In this way, a phase comparator can be implemented which enables the clock to be recovered independently of the type of coding used for the data. In particular, it can operate on NRZ data, as used in most high bit rate optical transmission systems.

Figure 8:
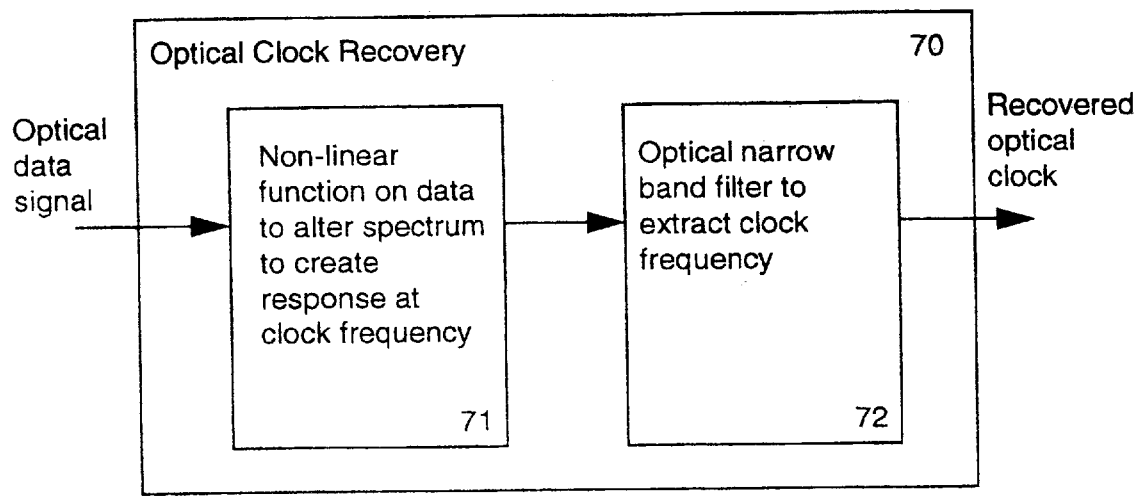
FIG. 8 shows another optical clock recovery arrangement.

FIG. 8 illustrates the second optical clock recovery arrangement 70, comprising a non-linear function operating on the optical data, 71, followed by an optical narrow band filter 72 to extract the clock frequency. The use of a non-linear function enables the clock to be recovered from data such as NRZ data for which there is little energy at the clock frequency. The non-linear function creates a response at the clock frequency.

Figure 9:
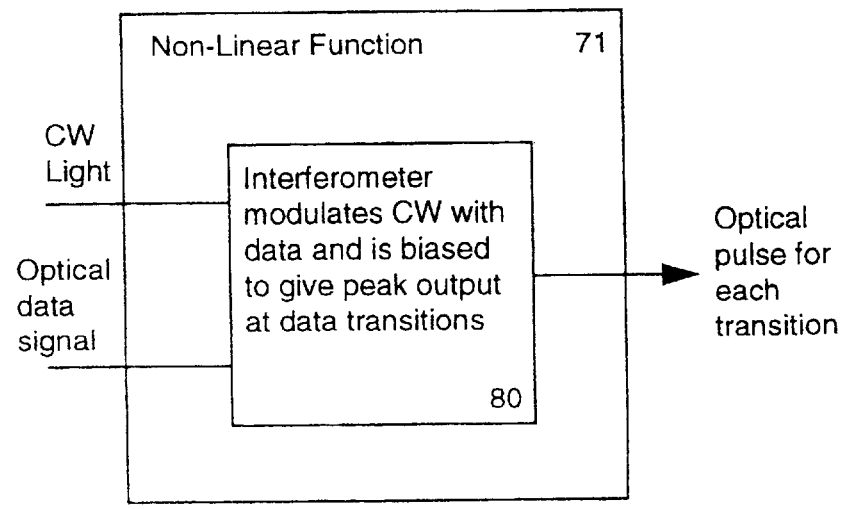
FIG. 9 shows a non-linear function for use in the optical clock recovery arrangement of FIG. 8.

FIG. 9 shows how the non-linear function 71 can be implemented by an interferometer 80, arranged as in FIG. 3. Instead of an input optical pulse train, because there is no separately generated clock, continuous wave light is input. This is modulated by the optical data, and the interferometer is biased to give a peak output at data transitions, as described above in relation to FIG. 7. If an optical pulse is output for each data transition, by the non-linear function 71, the optical narrow band filter 72 shown in FIG. 8 can be used to remove all but the clock frequency. Preferably the optical narrow band filter is implemented by a means of a mode-locked laser, although alternative implementations are conceivable.

Figure 10:
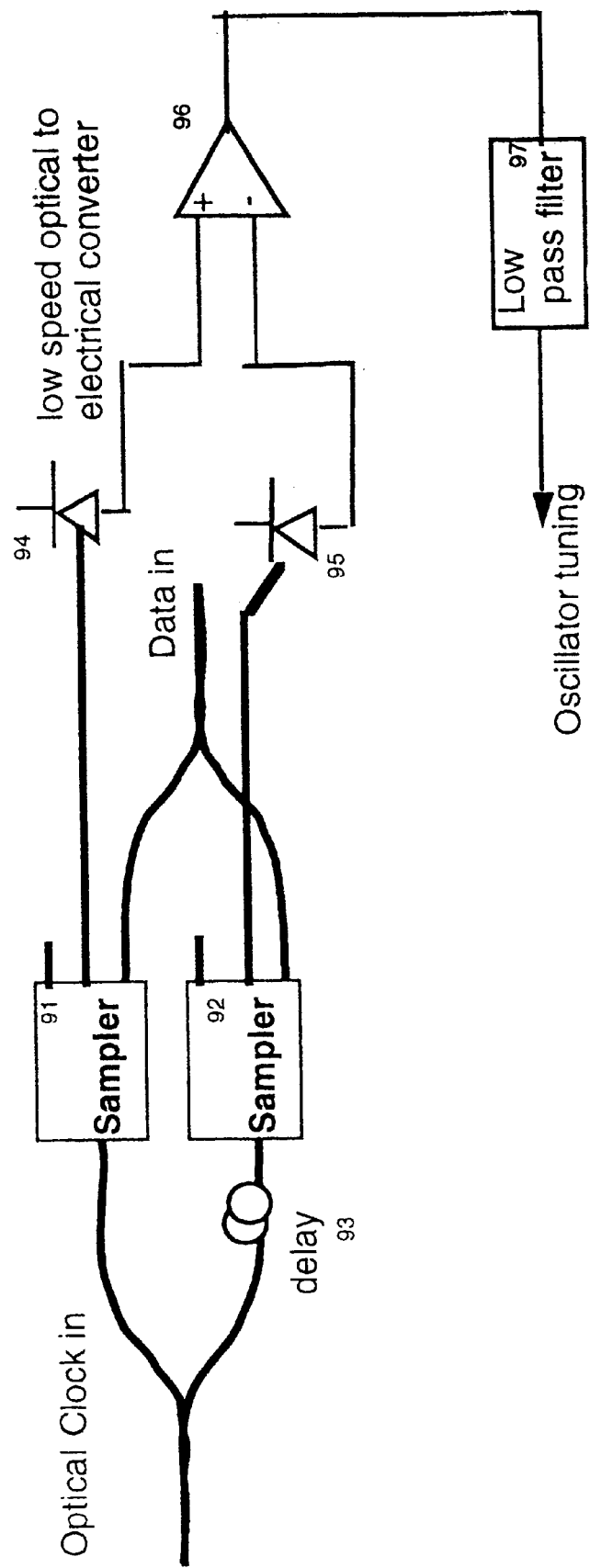
FIG. 10 shows a phase comparator with common mode cancellation for use in the clock recovery arrangement of FIG. 5.

For systems where there are problems such as level variations, or data patterning, that create excessive jitter, then the arrangement of FIG. 10 can be used. The difference between outputs of two samplers 91, 92, operating as phase comparators, are subtracted to cancel common mode effects. A delay element 93 is provided to delay the clock input of one of the phase comparators. The delay can be arranged to be such that there is a minimal response from one of the comparators when the other is giving a peak output. Thus the outputs of the samplers 91, 92, are integrated and filtered by optical to electrical converters 94 and 95. A subtractor 96 and low pass filter 97 can be used to derive an oscillator tuning signal from which common mode effects have been cancelled out.

Optical Regeneration and Other Applications of Optical Sampling

Figure 11:
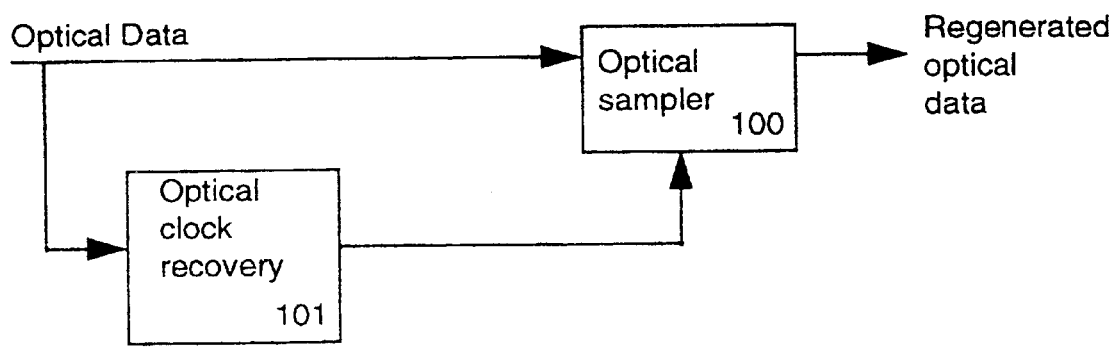
FIG. 11 shows an optical regenerator.

The optical clock recovery circuits discussed above can be used in receivers or regenerators. They can be used in conjunction with electrical signal reshaping and retiming, or used with optical retiming and reshaping functions, to create an all optical regenerator, as shown in FIG. 11. Sampler 100 is fed by the output of the optical clock recovery function 101. A similar arrangement may occur at a receiver, where the optical sampler 100 is used for retiming and reshaping the optical data prior to conversion to electrical form, and subsequent processing such as demultiplexing.

Figure 12:
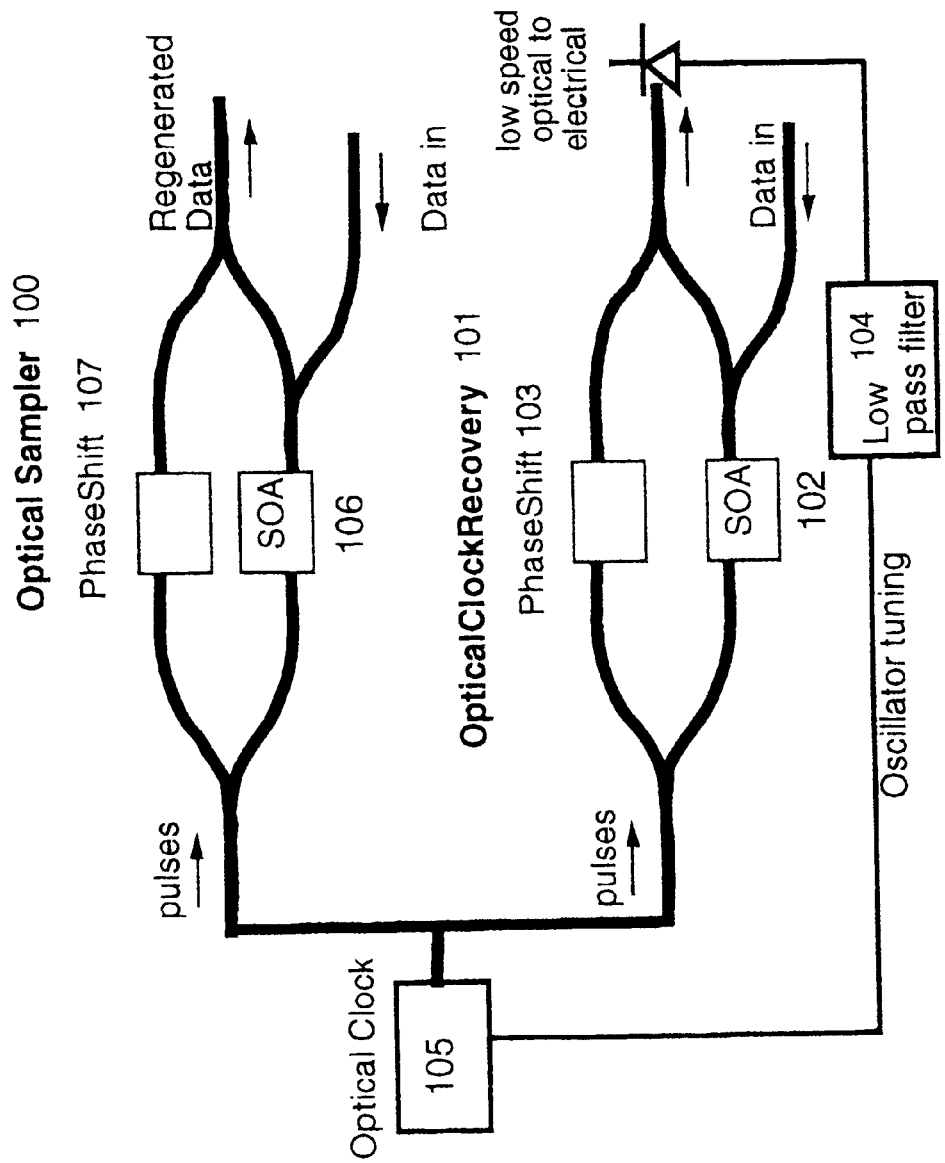
FIG. 12 shows the optical regenerator of FIG. 11 in more detail.

FIG. 12 shows the optical regenerator of FIG. 11 in more detail. The sampler 100 comprises an interferometer, biased to give maximum output when the data input is in a given logical state. The optical recovery circuit 101 also comprises an interferometer, this time biased to produce a peak output on data transitions, to enable it to function as a phase comparator. A semiconductor optical amplifier 102 acts as the optically active element for changing the interference condition of the interferometer, according to the data signal fed into the same arm of the interferometer. Phase shift means 103 is provided for biasing the interferometer to achieve the desired function. A low pass filter 104 and optical clock 105 complete the phase locked loop, to lock the optical clock to the transitions in the data.

In the sampler 100, a semiconductor optical amplifier (SOA) is again provided to alter the interference condition according to the data signal, and phase shift means 107 is provided to bias the interferometer to achieve the sampling function.

In this way, an all optical regenerator can be achieved capable of handling NRZ data and capable of being integrated for cost effective regeneration, particularly suitable for higher bit rate transmission systems where electrical regeneration becomes more difficult and expensive.

Figure 13:
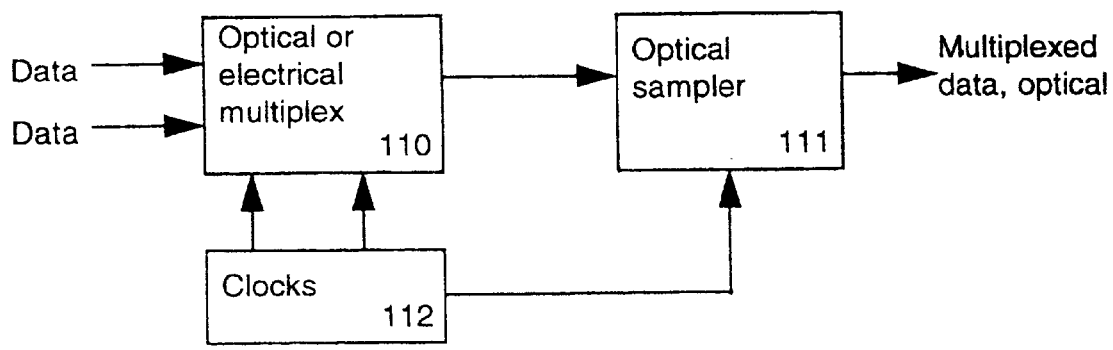
FIGS. 13 and 14 show multiplexers.
Figure 14:
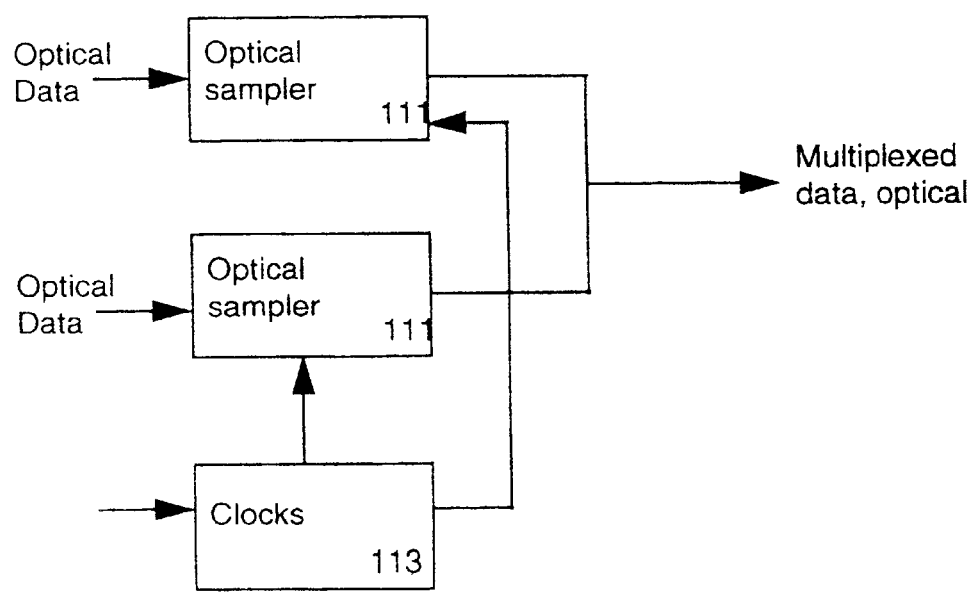

FIG. 13 and 14 show applications of the optical sampler as illustrated in FIG. 12 or in FIG. 3, in multiplexer arrangements.

FIG. 13 shows a multiplexer arrangement in which multiplexing is carried out by optical or electrical multiplex means 110, and then an optical sampler 111 is provided to retime and reshape the combined signal, for onward transmission. Synchronisation is provided by clocks 112. Two clocks could be provided to the multiplexer 110 to switch the two incoming data streams appropriately to enable time division multiplexing. This could be on the basis of a bit interleave scheme, though other well known schemes are conceivable. Although only two data inputs are shown, obviously there could be more.

An alternative multiplexer arrangement using the optical sampler described above, is shown in FIG. 14. An optical sampler 111 is provided for each of the optical data inputs to be multiplexed. Separate clocks are provided for each sampler so as to sample each optical data input at a different time interval. The mutually out of phase output samples can then be combined optically to produce a single multiplexed optical data output stream.

Figure 15:
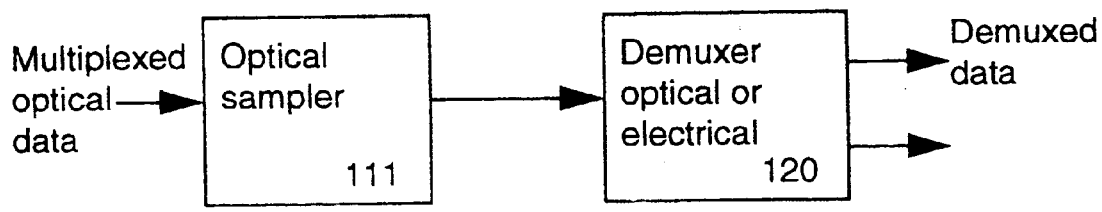
FIGS. 15 and 16 show demultiplexers.
Figure 16:
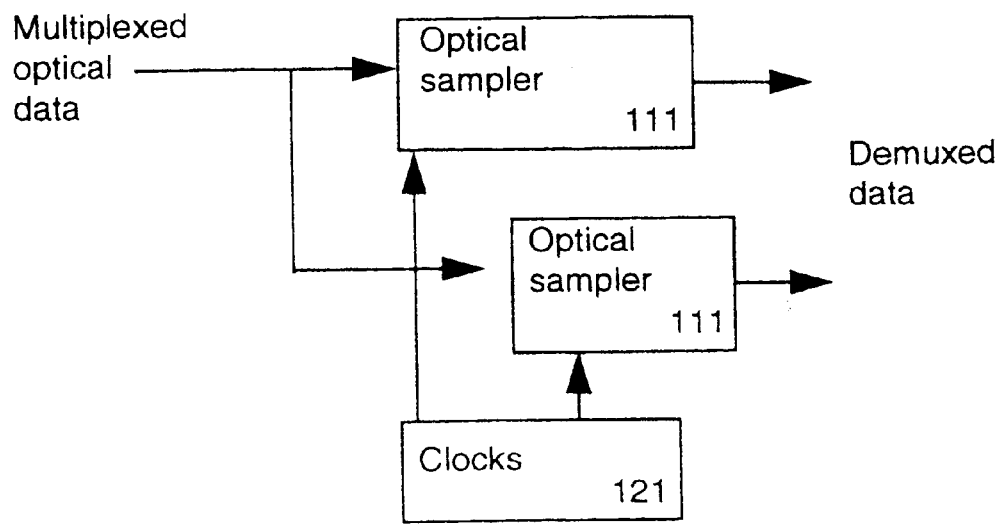

FIGS. 15 and 16 show corresponding demultiplexing arrangements using the optical sampler described above. In FIG. 15 the sampler 111 is used to retime and reshape the incoming optical data stream. This enables the optical or electrical demultiplexer 120 to be of lower performance specification, since it is fed with a clean optical signal with little jitter.

FIG. 16 shows an alternative arrangement, in which multiple optical samplers 111 are fed with the same input data stream. Separate clocks are provided for each sampler so that samples are taken at different times by different samplers. This enables the time division multiplexed data to be separated out.

In principle, the demultiplexer arrangements of FIGS. 15 and 16 could be used to decode multilevel logic signals. Different samplers could be biased individually so as to give a maximum output for different amplitude levels.

Interferometer Operation and Arrangements

Figure 17:
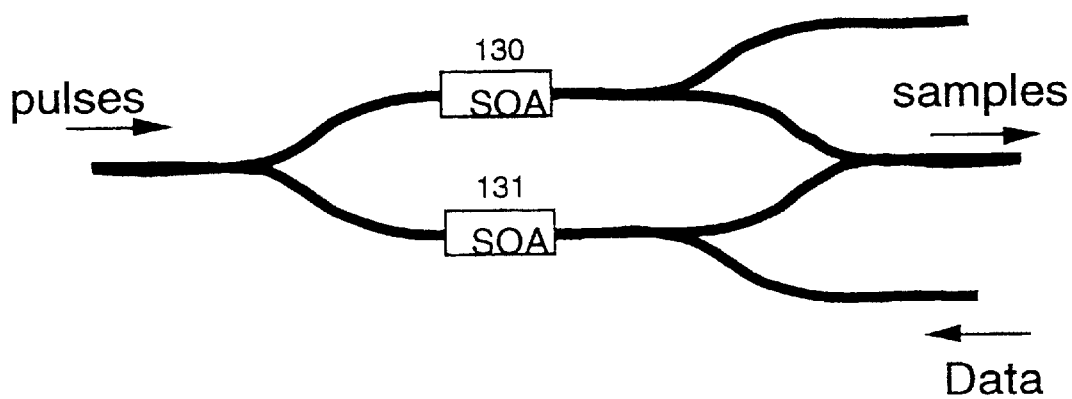

As an alternative to the interferometer arrangement shown in FIG. 3, FIG. 17 shows an arrangement in which the optically active element, the optical amplifier is provided in both arms of the interferometer. This makes it easier to balance the interferometer. In principle, the interference condition of the interferometer, and therefore the response at the output, is dependent on the amplitude of the modulation of the optical waveform, and on the phase of the optical waveform in each arm, ignoring polarisation effects. The optical amplifiers 130 and 131 in FIG. 17 can alter the interference condition. When data is input to the arm containing optical amplifier 131, the interference condition will be changed because the optical amplifier has an amplitude to optical phase conversion effect. Ideally, the pulses input to both arms, are sufficiently short and have sufficiently low energy that the SOA does not react much to the pulses. However, the SOA should have a sufficiently rapid response time to react to the data waveform. The pulses input to both arms of the interferometer can therefore be very narrow, as there is no limit imposed by the speed of the response of the SOAs. Furthermore, it is relatively easy to generate very narrow light pulses, on the order of several picoseconds or less.

Construction of an integrated Mach-Zehnder interferometer for use with high bit rates and with good performance characteristics is described in IEEE Photonics Technology, Volume 8, September 1996 "Ten Gbs Wavelength Conversion With Integrated Multiquantum-Well-Based Three-Port Mach-Zehnder Interferometer" by Idler et al. The structure is grown by low pressure metal organic vapour phase epitaxy. The device described can be used either for outputting inverted or non-inverted data, with respect to the signal input data. Although it is described for the purpose of wavelength conversion, based on inputting a continuous wave into both arms of the interferometer, such a device could be used for the application as described above.

FIG. 18 shows an alternative arrangement in which a continuous wave bias is fed in in addition to the input pulses. This enables the operating point of the amplifiers to be set. A filter 140 would be required to remove the continuous wave from the output. In this figure and in FIG. 17, an output path at the top right is shown, which is unused, and provided only for balancing the arrangement.

FIG. 19 shows another interferometer arrangement in which one of the optical amplifiers is replaced with an electrically controlled phase shifter. An example of such a phase shifter is described in Photonics Technology Letters, June 1990, pages 404 to 406, and Photonics Technology Letters, August 1996, pages 1018 to 1020 (Rolland et al). The gain/loss of the arm containing the phase shifter can be adjusted to match that in the arm containing the SOA. The phase shifter can be used to set the desired condition of interference, to enable peak output for the data input logic state being high, or low, or somewhere in between, as desired.

One advantage of using such an optically passive device is that less ASE (amplified spontaneous emission) noise is generated. Furthermore, by using a phase shift device with little or no gain variation, the interference condition can be controlled more easily, since there is independent control of gain and phase differences between the two arms.

The electrically controlled phase shifter need only operate at low frequencies, eg below 1 Megahertz, when only used for tuning. If a high frequency phase shifter were to be provided, then combined optical and electrical data inputs could be handled.

FIG. 20 shows another interferometer arrangement. If the phase shifter 160 is placed in the same arm as the SOA 161, the other arm becomes a simple transmission line. This has the advantage of better balance in the losses between the two arms. The phase shift will tend to attenuate the signal. The SOA can compensate for this by amplifying the signal. Electrically tuned attenuators could also be added to either arm, to balance the power levels. Other elements which have an optical phase shift in response to an optical power level could be used in place of the SOA. Other interferometer configuration such as a Michelson arrangement could be used. The entire device could be integrated for a low cost high volume production, using methods such as those discussed by Rolland et al.

All the arrangements discussed could be used either in the sampler or the phase detector or the non-linear response applications of the interferometer. A two stage interferometer arrangement will now be discussed with reference to FIG. 21, which is particularly applicable to the sampler.

The Two Stage Interferometer Arrangement

FIG. 21 shows an arrangement which would be suitable for replacing the single interferometer of the sampler in FIG. 12. The first stage comprises an interferometer having SOAs 170 and 171. Continuous wave light is fed into both arms, and data is fed into one arm. The gain in the first stage can be arranged to be sufficient to drive the first stage output to its limit for one level of input data (high or low depending on whether, the stage is to be inverting or not). This effectively makes gradual data transitions steeper, and flattens one of the logic states.

The second stage can be arranged to drive its output to its limit for the other logic level. Thus the data can be reshaped optically. if no retiming is required, but only reshaping, the second stage could be fed with continuous wave light. Alternatively, the retiming could be implemented by feeding the first stage with a pulse train.

Figure 22:
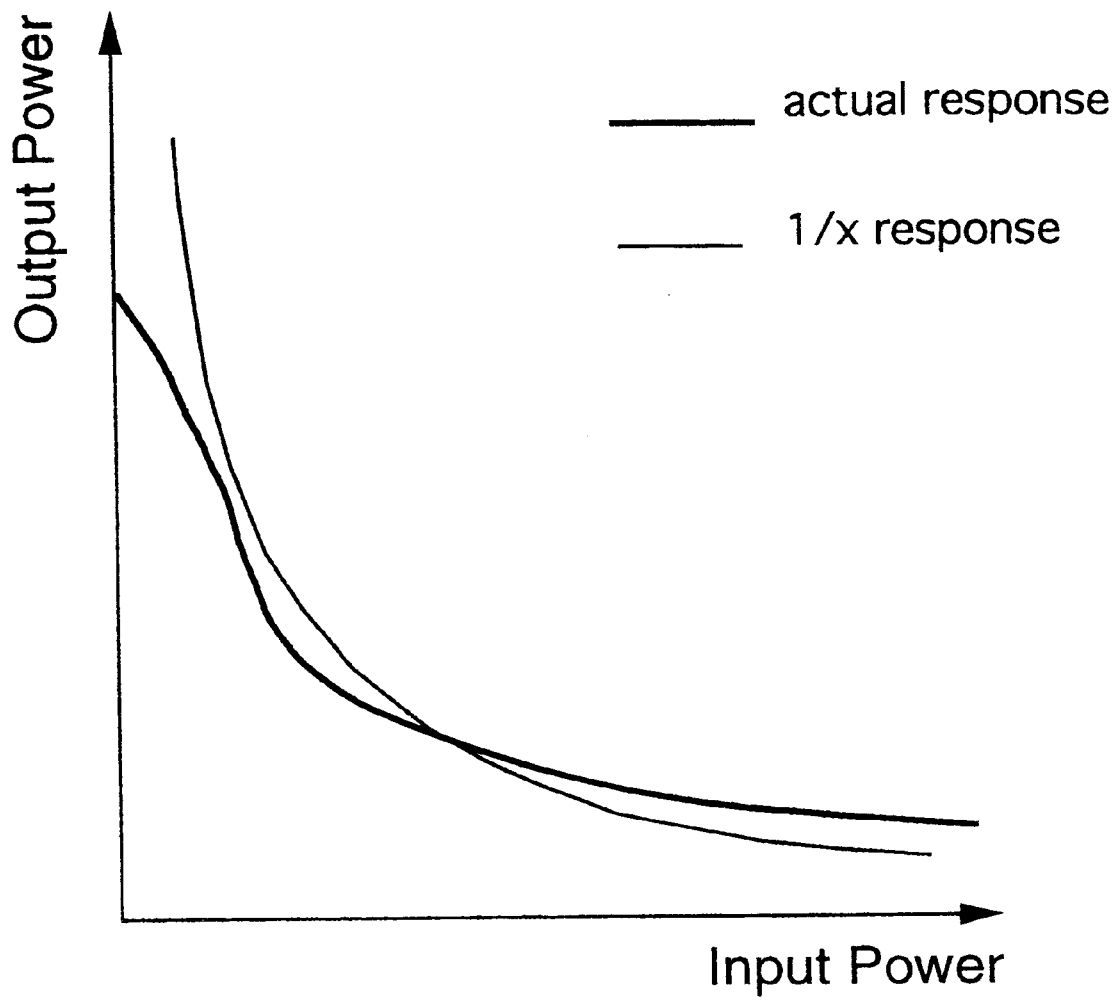
FIG. 22 shows the response of a single inverting stage.
Figure 23:
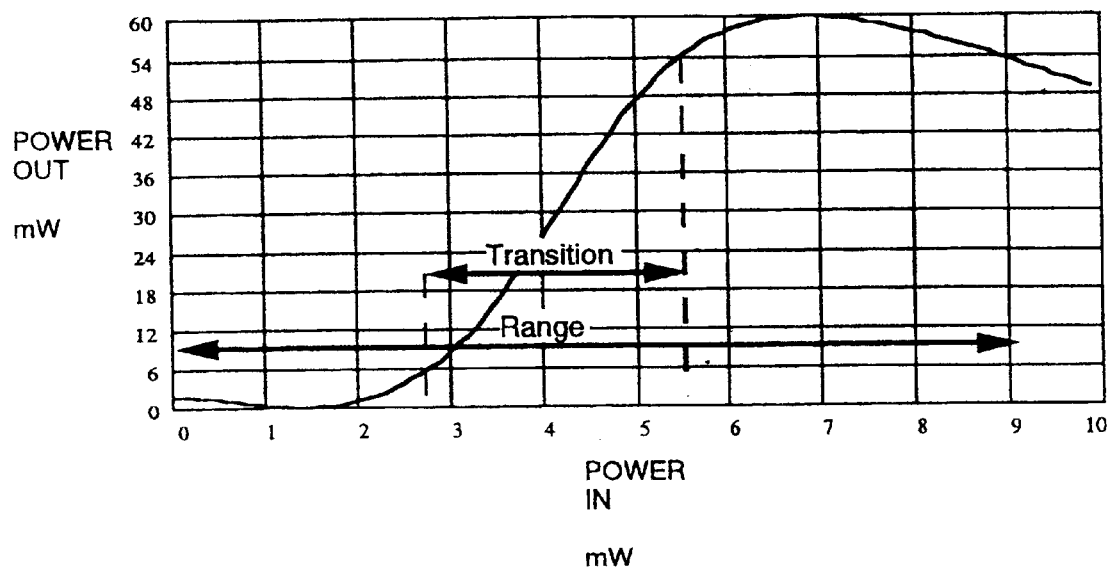
FIG. 23 shows the overall response for two stages.

FIG. 22 shows the output power for the first stage versus input power, where the first stage is an inverting stage. For a logical zero data input, the power output is high, driving the output to its limit, and thus flattening the logic level 1 of the output. The output of the first stage should follow a response curve which is less steep than a 1/x curve at low input powers, and is flatter than the 1/x curve at higher input powers, but steeper at intermediate powers. Such a shape, when used in two stages results in the overall response shown in FIG. 23. For good sampling of data and to produce steep transitions, the transition range should be as short as possible. Furthermore, the transition range should be located so as to be centred around the threshold between high and low logic states for the input signal. If inverting devices are used, the transition can be centred more easily since the inversion causes the second stage response to balance the steepest portion of the first stage response, rather than accentuate it.

In principle, a device with more than two stages could be constructed. Furthermore, the stages could be in parallel rather than in series. If in parallel, some sort of time division multiplexing for the two logic states would be required. Furthermore, the stages could be non-inverting, though for interferometers at least, the inverting response is preferable. Optical devices other than interferometers could be used if they have a non-linear response similar to that shown in FIG. 22.

For good optical regeneration of data, a short transition range will determine how steep the transitions of the change in interference condition of the second interferometer are. In turn, this can effect the sampling process which takes place in the second stage. If the second stage is fed by continuous wave light, the steepness of transition in interference condition will determine the shape of the output data transitions.

Figure 24:
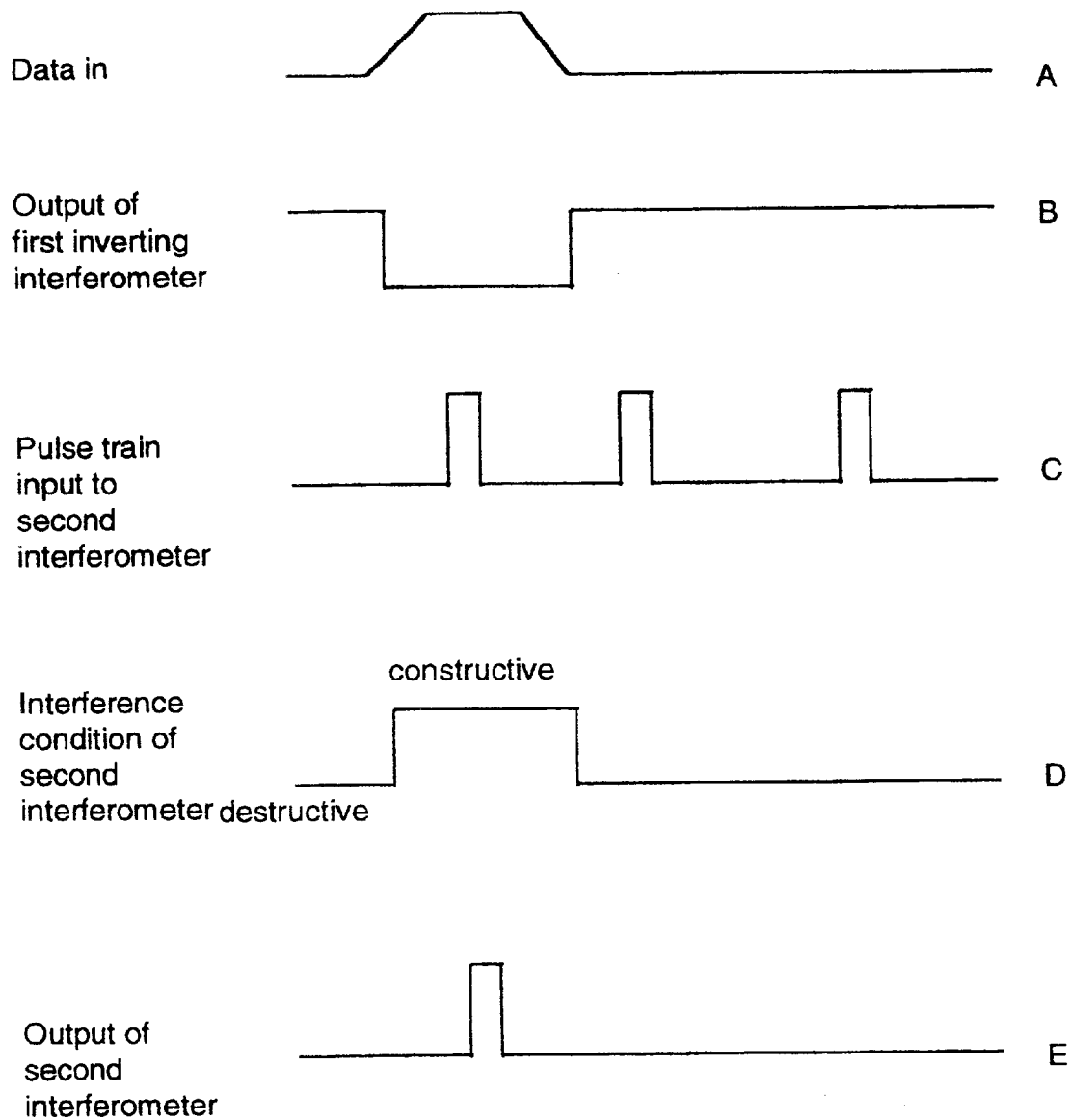
FIG. 24 shows waveforms for the arrangement of FIG. 21 operating as a sampler.

FIG. 24 shows at waveform A the data input. The output of the first inverting interferometer is shown in waveform B, which has steeper transitions than waveform A. The pulse train of waveform C is the other input to the second interferometer. Waveform D shows how the interference condition of the second interferometer is dependent on the output of the first interferometer.

The limiting action of the first interferometer would remove noise from the signal for the period when the data input is in a high state. However, noise at the low state of the data input, would remain on the output of the first inverting interferometer. However, the interference condition of the second interferometer, shown in waveform D, would exhibit little noise on either the high level state or the low level state. Furthermore, the transitions in waveform D would be even steeper than those in waveform B, owing to the response of the type shown in FIG. 22. This leaves a relatively wide "eye", for the sampling pulse of the pulse train in waveform C. Accordingly, the output waveform E in FIG. 24 will be relatively free of noise, and relatively immune to jitter in the data input.

For devices or arrangements where there is a limited amount of gain, and therefore only moderate limiting, the regeneration performance may not be as good in terms of jitter immunity and noise reduction, as can be achieved with electrical regeneration. For example, if the gain is limited to a factor of 3, a signal at 10% above the threshold between high and low, might be increased to 30% above the threshold. If the threshold is set at 50% of the maximum signal, then the output would be up to 80% of the maximum, and therefore the limiting action would be only partial. Nevertheless, it would clearly be beneficial, even without complete limiting up to 100% of the signal range.

If the response curves for the two individual stages are not identical, then the overall response shape can be altered by altering the relative gains of the two stages. This adds an extra degree of freedom. In designing the device, the amplification characteristics of the optical amplifiers in the interferometers can be varied. The relative powers of the three inputs, the data input, the continuous wave input, and the pulse train input, can be varied. Furthermore, the coupling between the two stages can be varied. In this way, the two stage device offers more flexibility for tailoring the response to the needs of the particular application.

There are a number of applications where such partial optical regeneration would be useful. Firstly, inside an optical amplifier, eg a bi-directional optical amplifier, having multiple stages, improved performance could be achieved if the output of a first stage of amplification was subject to such partial optical regeneration, before passing through a filter and into a second stage of amplification. Noise and jitter could be reduced.

Secondly, inside an optical switch, it could be useful to have partial optical regeneration to avoid accumulation of degradations.

Finally, partial optical regeneration would be useful if applied between WDM subnetworks, for purposes of at least partial isolation, so that each subnetwork could be operated and specified independently of the degradations occurring in neighbouring networks.

Other variations will be apparent to a person skilled in the art, falling within the scope of the claims.

What is claimed is:

1. An interferometer arrangement comprising an interferometer for receiving an optical signal modulated with data to vary an interference condition of the interferometer according to the data such that an output of the interferometer based on the interference condition is responsive to transitions in the data.

2. The interferometer arrangement of claim 1 having a two arm configuration, arranged such that the data modulated optical signal is fed to at least one of the arms, to vary the interference condition.

3. The interferometer arrangement of claim 1 comprising means for biasing the interferometer to give a peak output when the data is at an intermediate state between low and high states.

4. A clock recovery arrangement for recovering a clock from an optical data signal comprising:

the interferometer arrangement of claim 1; and means for deriving a clock signal from the output of the interferometer arrangement.

5. The clock recovery arrangement of claim 4 wherein the deriving means comprises means for generating an optical clock signal, whose phase is dependent on the output of the interferometer arrangement.

6. The clock recovery arrangement of claim 5 wherein the interferometer is arranged to receive the generated optical clock, and the interferometer output is dependent on the relative phases of the generated optical clock and the transitions in the optical data signal.

7. The clock recovery arrangement of claim 4 wherein the deriving means comprises a resonant filter.

8. An optical retiming arrangement comprising the clock recovery arrangement of claim 4, and an optical sampler for sampling the optical data signal on the basis of the recovered clock.

9. A method of detecting data transitions in an optical data signal using an interferometer arrangement comprising the steps of:

inputting the optical data signal to the interferometer arrangement to vary an interference condition of the arrangement; and biasing the arrangement to output a signal responsive to the transitions in the data.

10. A method of recovering a clock from an optical data signal comprising the step of: inputting the optical data signal to an interferometer comprising an optically active element;

deriving an optical clock signal synchronised to the optical data signal; and generating an electrical control signal for adjusting a rate of the optical clock, to achieve the sychronisation to the optical date signal.

11. The method of claim 10 wherein the interferometer comprises a two arm interferometer.

12. A clock recovery device for recovering a clock from an optical data signal, the device comprising an interferometer having an optically active element, the interfermoeter being arranged to receive the optical data signal;

an optical clock signal generator; and circuitry for producing an electrical control signal for adjusting the optical clock signal output by the optical clock generator, to synchronise the optical clock signal to the optical data signal.

13. An optical receiver having the clock recovery device of claim 12.

14. A node for an optical network having a receiver as set out in claim 13.

15. An optical regenerator comprising the clock recovery device of claim 12 and apparatus for using the optical clock signal output by the clock recovery device, to retime the optical data signal.

* * * * *